US007372057B2

(12) United States Patent
Gaebel et al.

(10) Patent No.: US 7,372,057 B2
(45) Date of Patent: May 13, 2008

(54) ARRANGEMENT FOR PROVIDING A REPRODUCIBLE TARGET FLOW FOR THE ENERGY BEAM-INDUCED GENERATION OF SHORT-WAVELENGTH ELECTROMAGNETIC RADIATION

(75) Inventors: Kai Gaebel, Jena (DE); Diethard Kloepfel, Kleinhelmsdorf (DE); Guido Hergenhan, Jena (DE)

(73) Assignee: Xtreme technologies GmbH, Jena (DE)

(*) Notice: Subject to any disclaimer, the term of this patent is extended or adjusted under 35 U.S.C. 154(b) by 265 days.

(21) Appl. No.: 11/213,007

(22) Filed: Aug. 26, 2005

(65) Prior Publication Data

US 2006/0043319 A1 Mar. 2, 2006

(30) Foreign Application Priority Data

Aug. 31, 2004 (DE) ..................... 10 2004 042 501

(51) Int. Cl.
*G01J 3/10* (2006.01)

(52) U.S. Cl. .............................. 250/504 R; 250/497.1

(58) Field of Classification Search ............. 250/504 R
See application file for complete search history.

(56) References Cited

U.S. PATENT DOCUMENTS 6,452,194 B2 9/2002 Bijkerk et al.
6,661,018 B1 * 12/2003 McGregor et al. ...... 250/504 R
6,792,076 B2 * 9/2004 Petach et al. ............... 378/119
6,972,421 B2 * 12/2005 Melnychuk et al. .... 250/504 R
2003/0194055 A1 10/2003 Mochizuki
2003/0223541 A1 * 12/2003 Petach et al. ............... 378/119
2003/0223546 A1 12/2003 McGregor et al.
2004/0108473 A1 * 6/2004 Melnychuk et al. .... 250/504 R
2005/0230645 A1 * 10/2005 Melnychuk et al. .... 250/504 R
2006/0017023 A1 * 1/2006 Taylor et al. ........... 250/504 R
2006/0017026 A1 * 1/2006 Hergenhan et al. ..... 250/504 R

FOREIGN PATENT DOCUMENTS

WO 97/40654 10/1997
WO 99/42904 8/1999
WO 2004/036612 4/2004

* cited by examiner

*Primary Examiner*—Jack I. Berman
*Assistant Examiner*—Andrew Smyth
(74) *Attorney, Agent, or Firm*—Reed Smith LLP

(57) ABSTRACT

The invention is directed to an arrangement for providing a reproducible target flow for the energy beam-induced generation of short-wavelength radiation. It is the object of the invention to find a novel possibility for providing a reproducibly supplied target flow for the generation of a plasma that emits short-wavelength radiation which ensures a high directional stability of the target flow over a large number of individual plasma generation process for any target materials under given process conditions. According to the invention, this object is met in that a nozzle protection device is provided in the interaction chamber between the target nozzle and the interaction point for the generation of the plasma, and the nozzle protection device contains a gas pressure chamber which has an aperture along the target path for unobstructed passage of the target flow and which is filled with a buffer gas that is maintained at a pressure of some 10 mbar.

25 Claims, 7 Drawing Sheets

ARRANGEMENT FOR PROVIDING A REPRODUCIBLE TARGET FLOW FOR THE ENERGY BEAM-INDUCED GENERATION OF SHORT-WAVELENGTH ELECTROMAGNETIC RADIATION

CROSS-REFERENCE TO RELATED APPLICATION

This application claims priority of German Application No. 10 2004 042 501.9, filed Aug. 31, 2004, the complete disclosure of which is hereby incorporated by reference.

BACKGROUND OF THE INVENTION a) Field of the Invention

The invention is directed to an arrangement for providing a reproducible target flow for the energy beam-induced generation of a plasma that emits a short-wavelength radiation, in particular for the generation of EUV radiation. It is applied particularly in projection lithography for semiconductor chip fabrication.

b) Description of the Related Art

A radiation source based on energy beam-induced excitation of plasma that is used for applications which are stable over long periods of time, e.g., in semiconductor fabrication for EUV lithography, must have a very durable injection system for providing targets so that the required high directional stability is maintained over a very large number of individual plasma generation processes.

Systematic studies conducted by XTREME technologies GmbH on the operating life of target nozzles have shown that erosion at a nozzle after approximately one million plasma generation processes leads to an unstable target flow. Sputter particles (ions or atoms) that are unavoidably emitted by the plasma along with the desired radiation have been determined as the cause of erosion at the nozzle opening.

In energy beam-induced XUV plasmas (in particular laser-excited EUV plasmas), mass-limited targets, i.e., targets that provide the approximate quantity of atoms that can be excited to radiation in the region of interaction with the energy beam, are used according to the prior art. Mass-limited targets of this kind, which are preferably droplet target flows or jet target flows with a diameter appreciably less than one millimeter (at least in one dimension), have the purpose of minimizing vaporization processes of target material that is not sufficiently excited and minimizing the generation of sputter particles (usually called debris) in the interaction chamber. However, the generation of debris from the plasma cannot be totally suppressed.

In prior art EUV radiation sources, these kinds of sputter effects from the plasma have obviously not yet been investigated in relation to the target nozzle in view of the fact that publications concerning debris reduction are geared exclusively to the operating life of the optics that are employed. For example, WO 99/42904 discloses a filter for protecting collector optics which is positioned between the source and the optics as a honeycomb structure. The interaction of the particles with a background gas results in a retardation of the particles and subsequent condensation at the filter walls. However, since the filter is arranged in the optical light path of the emitted radiation, a sufficiently high degree of transparency must be ensured for the emitted EUV radiation in the interaction chamber over a large solid angle by a sufficiently low (vacuum) pressure on the one hand, so that the gas atmosphere in the interaction chamber absorbs as little emitted radiation as possible, and, on the other hand, by minimizing shadows cast by the honeycomb structure of the filter.

As will be shown, solutions are also known from the prior art which have similarities to the present invention, although the teaching according to the invention is not rendered obvious thereby.

US 2003/0223546, for example, describes a pressure reservoir directly around the target nozzle with a buffer gas which serves to generate droplet targets and which especially reinforces the target shaping of xenon droplets. Another surrounding chamber in which the buffer gas can then be sucked out again leads to an acceleration of the droplet targets and regulation of the intervals between the droplet targets. There is no mention of a reaction on the target nozzle.

Further, it has been shown for a radiation source with high average output such as is required in semiconductor chip fabrication that degradation processes likewise occur at the nozzle due to the radiation from the plasma that is absorbed by the nozzle. By degradation is meant both irreversible and reversible thermal changes due to radiation absorption at the nozzle opening which lead—at least temporarily—to an appreciable deterioration in the directional stability of the target jet.

With regard to the set of problems in stabilizing a reproducibly provided, continuous target jet over time, WO 97/40650 discloses a step in which a continuous target jet is provided as a stable target flow for short-wavelength radiation sources. However, the problem of decreasing jet stability due to nozzle erosion over longer operating periods is not examined. Therefore, there is also no indication of suitable countermeasures.

It is the object of the invention to find a novel possibility for providing a reproducibly supplied target flow for the generation of a plasma that emits short-wavelength radiation which ensures a high directional stability of the target flow over a large number of individual plasma generation process for target materials with any vapor pressure under given process conditions.

In an arrangement for providing a reproducible target flow for the energy beam-induced generation of a plasma emitting short-wavelength radiation, particularly for the generation of EUV radiation in which a target nozzle is provided for introducing target material under pressure into an interaction chamber and in which an energy beam is directed to the target flow at an interaction point in the interaction chamber, the above-stated object is met, according to the invention, in that a nozzle protection device is provided in the interaction chamber between the target nozzle and the interaction point for the generation of the plasma, and in that the nozzle protection device contains a gas pressure chamber which has an aperture along the target path for unobstructed passage of the target flow and which is filled with a buffer gas that is maintained under a pressure at which a sputter particle from the plasma is subjected to at least one thousand collisions with particles of the buffer gas when traversing the gas pressure chamber.

In a pressure range of some 10 mbar, an energy sputter particle already collides with particles of the buffer gas several thousand times over a distance of a few millimeters through the gas pressure chamber and loses several orders of magnitude of kinetic energy. The person skilled in the art will immediately be led to variations of longer gas pressure chambers with lower buffer gas pressures.

The nozzle protection device is advantageously constructed as a sputter protection plate in which the gas pressure chamber is incorporated. The gas pressure chamber has a cylindrical aperture and, radially, at least one channel for supplying the buffer gas.

In a first variant, the sputter protection plate advisably has a plurality of uniformly distributed radial channels as gas feeds for the buffer gas and an annular distribution channel arranged concentrically around the gas pressure chamber. The annular distribution channel connects the radial channels and has at least one gas inlet opening that does not meet one of the radial channels.

In a second variant, the sputter protection plate advantageously has an upper terminating plate and a lower terminating plate, each with an aperture for the passage of the target flow. The terminating plates are connected parallel to one another by an annular distribution channel which has at least one inlet opening for gas supply. The apertures of the gas pressure chamber are advisably arranged in the preferably circular terminating plates as coaxial bore holes.

It has proven advantageous when the nozzle protection device additionally has a heat protection plate with coolant channels or the coolant channels are integrated in the material of the gas pressure chamber as heat protection.

The nozzle protection device with the gas pressure chamber is advantageously arranged in the interaction chamber at a defined distance from the target nozzle.

In another advisable construction, the gas pressure chamber is arranged in the interaction chamber directly around the target nozzle. It is advantageous when the gas pressure chamber is arranged around the opening of the target nozzle by means of an antechamber housing that surrounds the target nozzle in a gas-tight manner. The antechamber housing has an aperture that is centered with respect to the axis of the target flow and has at least one gas feed for providing the buffer gas.

With respect to the injected target flow, a tin is advantageously used as the main target material and can liquefy under necessary defined process conditions. Tin chlorides, preferably tin(IV) chloride or tin(II) chloride in alcoholic or aqueous solution, are particularly suitable for this purpose.

An inert gas is advisably used as buffer gas for generating a partial pressure in the gas pressure chamber. This inert gas can be nitrogen or any noble gas, preferably argon. On the other hand, mixtures of inert gases can also be used, particularly a mixture of noble gases such as helium and neon.

In a particular construction of the nozzle protection device for which target materials with a vapor pressure of >50 mbar are used, the buffer gas in the gas pressure chamber is formed by gaseous target material due to the vaporization of the target flow in the interaction chamber and a partial pressure of some 10 mbar is adjusted due to the flow of vaporizing target material through the gas pressure chamber. This obviates a separate supply of buffer gas.

For this embodiment form of the invention, preferably liquid xenon is injected through the target nozzle as target material.

To support the buildup of pressure through vaporizing target material, the gas pressure chamber advantageously has at least one narrowed aperture for generating a dynamic pressure. The gas pressure chamber is preferably barrel-shaped.

The underlying idea of the invention is based on the understanding that the target nozzle (as well as the collector optics) of a plasma-based radiation source is damaged by debris emission and radiation from the plasma. However, for nozzle protection, in contrast to optics, a high optical transparency is not required. Rather, other parameters apply for optimal protection of the nozzle which merely do not impede or interfere with the liquid target flow. Therefore, the invention does not use a filter, but rather employs a gas pressure chamber which is arranged between the target nozzle and plasma along the target path with an individual aperture and in which the target nozzle is shielded from fast debris particles and from radiation emitted by the plasma by a quasi-statically adjusted, relatively high buffer gas pressure (some 10 mbar compared to the vacuum of less than 1 mbar in the interaction chamber).

The solution according to the invention makes it possible to provide a reproducibly supplied target flow for the generation of a plasma emitting short-wavelength radiation which ensures a high directional stability of the target flow for target materials with any vapor pressure under the respective process conditions over a large number of plasma generation processes and which therefore makes it possible to produce radiation sources with a long operating life.

The invention will be described more fully in the following with reference to embodiment examples.

DESCRIPTION OF THE PREFERRED EMBODIMENTS

Figure 1:
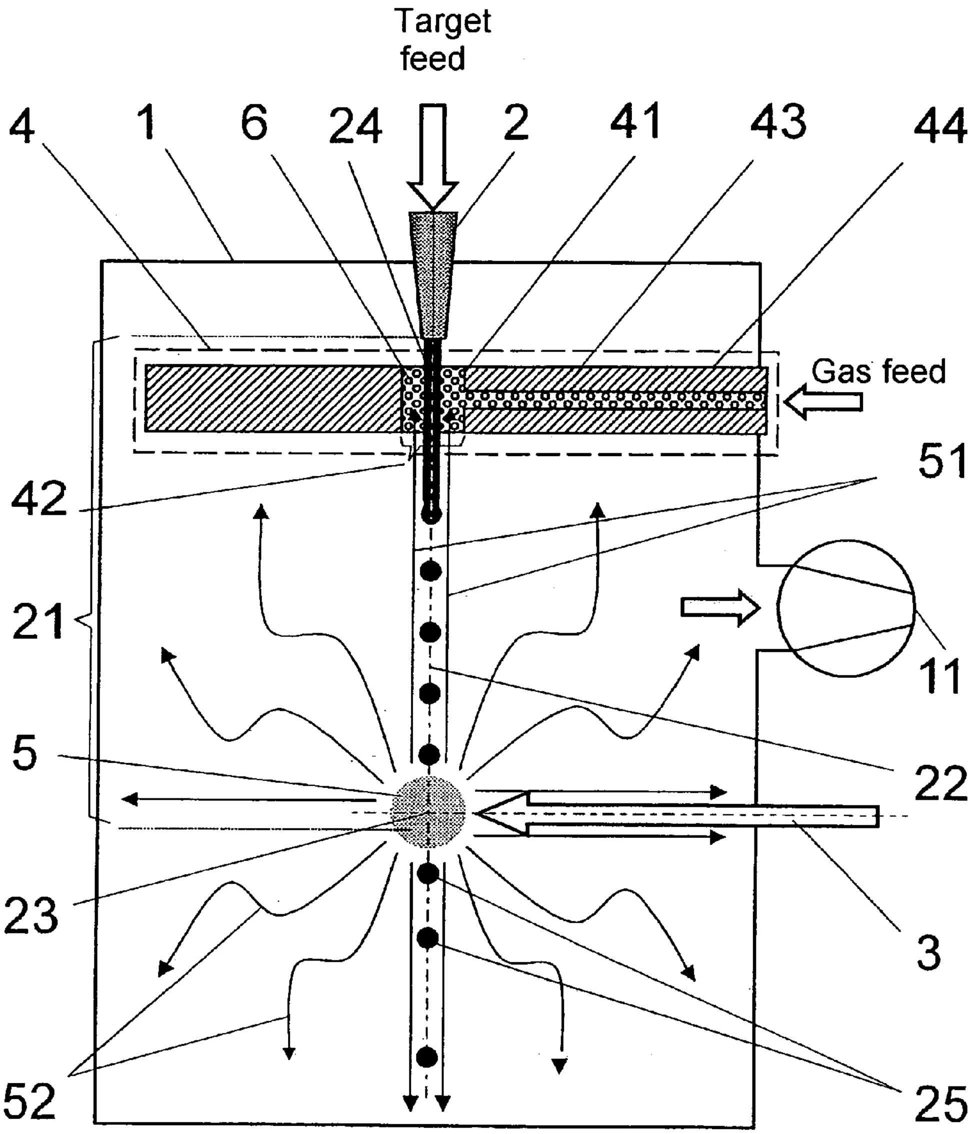
FIG. 1 illustrates the principle of the arrangement according to the invention.

As is shown schematically in FIG. 1, the arrangement according to the invention comprises an interaction chamber 1, a target generator (not shown) with a target nozzle 2, an energy beam 3 emitted by an energy beam source (not shown), and a nozzle protection device 4. The target nozzle 2 opens into the interaction chamber 1 and ejects therein a target flow 21 along a target path 22 in such a way that the energy beam 3 collides with the target flow 21 at an interaction point 23 and generates a hot plasma 5 locally for emitting a desired short-wavelength radiation (EUV radiation).

The nozzle protection device 4 is arranged between the target nozzle 2 and the plasma 5 and has a gas pressure chamber 41. The target flow 21, which comprises target material of any vapor pressure (e.g., liquid xenon, tin compounds, tin chloride salts, preferably in aqueous or alcoholic solution, alcohol, etc.), flows through the aperture 42 of the gas pressure chamber 41 along its target path 22.

An inert buffer gas 6 (e.g., nitrogen or a noble gas) is introduced into the rotationally symmetric gas pressure chamber 41 under pressure through at least one channel 43 opening into the latter radially to generate a volume for a short free path length for sputter particles 51 from the plasma 5 in the gas pressure chamber 41. According to the invention, sufficient sputter protection is achieved by providing a volume in which a sputter particle 51 collides with the buffer gas 6 on the order of approximately one thousand times. This takes place in a gas pressure chamber 41 with a length of a few millimeters already at a pressure of some 10 mbar. The pressure to be adjusted also depends to a great extent on the buffer gas 6 that is used.

In the above-described volume size of the gas pressure chamber 41, sputter particles 51 from the plasma 5 are decelerated by colliding with the gas molecules of the buffer gas 6 in such a way that they have only a minimal effect when reaching the target nozzle 2. For this purpose, depending on the molecular mass of the buffer gas 6 in the gas pressure chamber 41, a quasi-static (fluidically stationary) gas pressure of several tens of mbar must be built up relative to the vacuum pressure (<1 mbar) prevailing in the interaction chamber 1 by means of vacuum pumps, one of which 11 is shown by way of example in FIG. 1.

The buffer gas 6 can have any low transparency for the radiation 52 emitted from the plasma 5 as long as the pump(s) 11 maintain(s) a corresponding pressure difference up to the above-mentioned vacuum pressure at the interaction point 23.

The reproducibly provided target flow 21 is generally so constituted that it exits the target nozzle 2 as a continuous jet 24 and disintegrates into individual targets 25 after a certain length along the target path 22. The nozzle protection device 24 is arranged at a location near the target nozzle 2. The target flow 21 passes this location preferably in the form of a continuous jet 24. However, the target flow 21 can also be in the form of individual targets 25 (possibly already generated by a droplet generator as a series of droplets) at the location of the gas pressure chamber 41.

Figure 2:
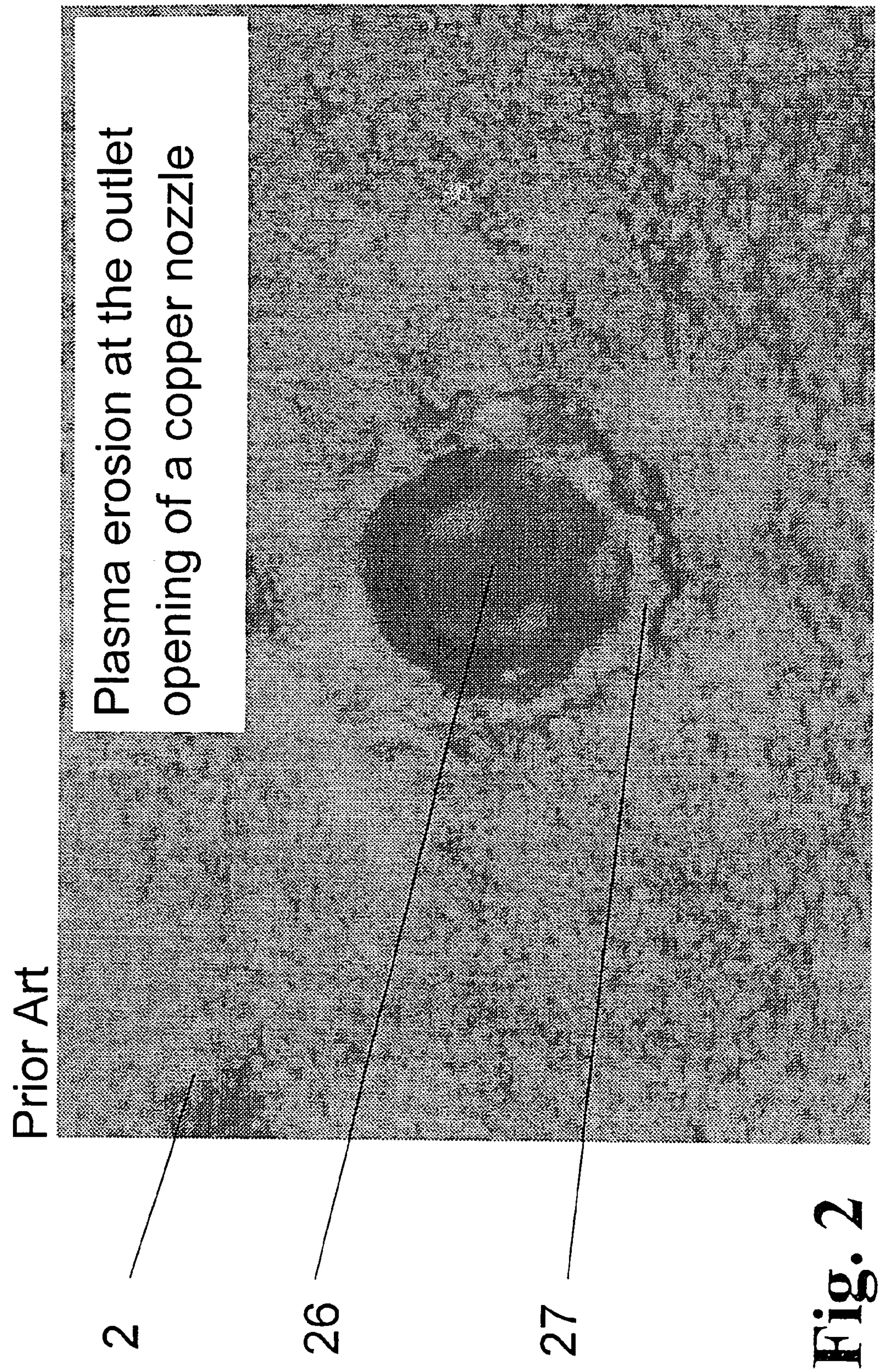
FIG. 2 is a photograph of nozzle erosion in a top view of a copper nozzle after approximately one million plasma generation processes (laser pulses)

FIG. 2 is a photograph showing an "unarmed" target nozzle 2 according to the prior art after an operating period of approximately one million plasma generation processes. Erosion craters 27 are clearly visible in an irregular arrangement around the outlet opening 26 of the target nozzle 2. The crater formation is caused by the emission of sputter particles 51 which necessarily accompanies the radiation emission from the plasma 5. In addition, there is high-energy short-wavelength radiation (photons 52) that is likewise damaging to the target nozzle 2 and which leads to reversible and irreversible changes in the target nozzle 2 in the area of its outlet opening 26. Above all, the erosion craters 27 influence the direction of the target jet 24 exiting from the target nozzle 2 and result in spatial instability which is appreciably reduced when the invention is used.

Figure 3:
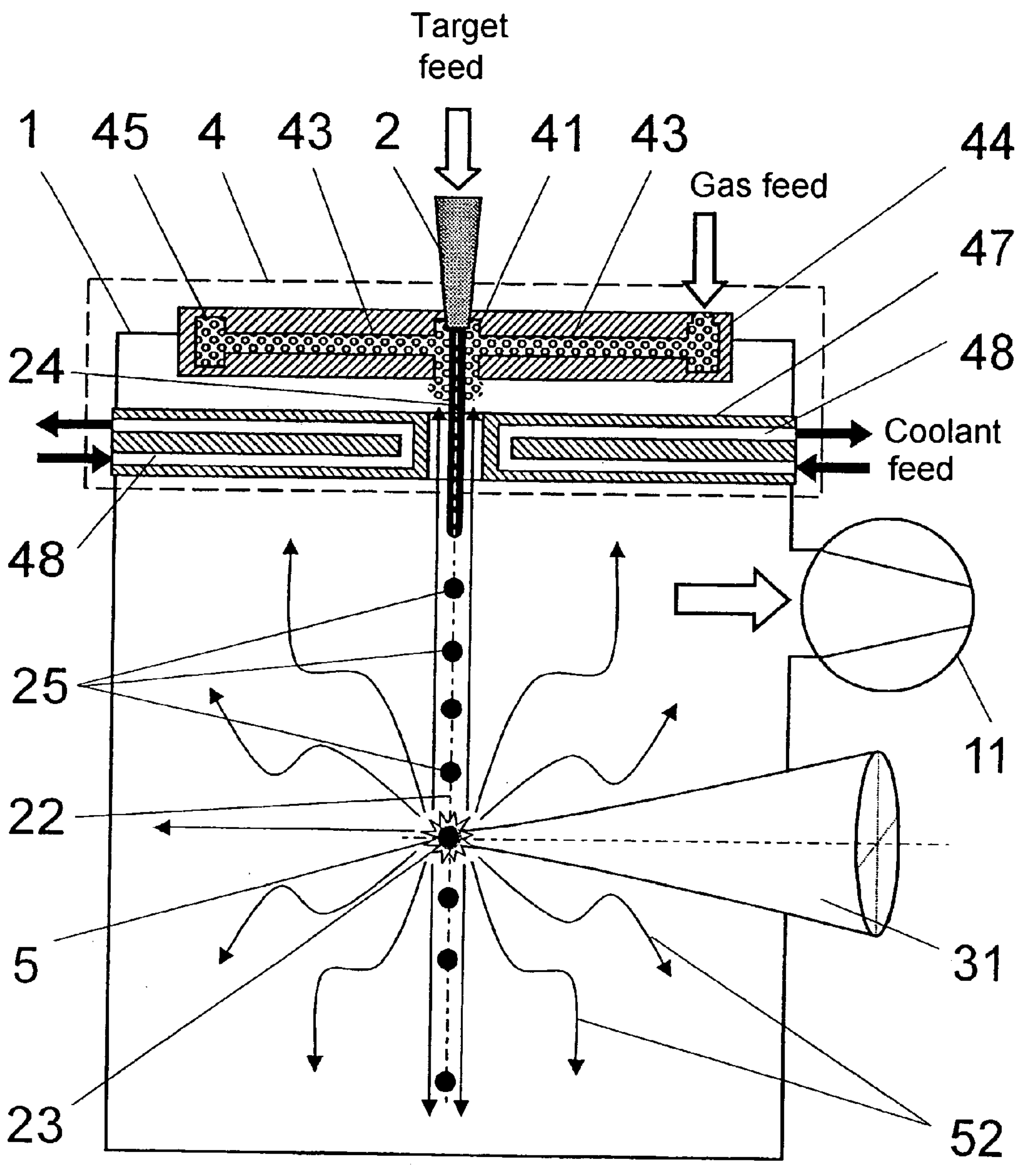
FIG. 3 shows a constructional variant with a sputter protection plate through which a buffer gas flows, this buffer gas being admitted to the gas pressure chamber in a uniformly distributed manner via an outer annular channel and a plurality of radially directed channels to generate a quasi-static pressure.

FIG. 3 shows a nozzle protection device 4 in the form of a sputter protection plate 44 with a gas volume of defined gas density that flows through the gas pressure chamber 41. The sputter protection plate 44 is supplemented by a heat protection plate 47 inside the interaction chamber 1. The sputter protection plate 44 has a plurality of radial channels 43 for the uniform supply of gas from an outer annular distribution channel 45. A gas inlet opening is provided in the annular distribution channel 45 for the buffer gas 6 that is supplied under pressure.

In this example, the target flow 21 is designed in such a way that it still traverses the two protective plates that are arranged parallel to one another, i.e., the sputter protection plate 44 and the heat protection plate 47, as a continuous jet 24 and then disintegrates into individual targets 25, a selected fraction of which is struck at the interaction point by a laser beam 31 (as concrete realization of the energy beam 3) and transformed into plasma. The conditions in the interaction chamber 1 are maintained as described with reference to FIG. 1.

The heat protection plate 47 has an aperture 42 allowing the target flow 21 to pass through and cooling channels 48 arranged around the aperture 42 through which a suitable coolant flows. The target flow 21 passes the latter without obstruction and protects the target nozzle 2 against thermal loading because it forms a barrier for all energy particles from the plasma 5 (e.g., fast electrons, ions, uncharged sputter particles 51, photons 52, etc.).

The heat protection plate 47 is located between the plasma 5 and the target nozzle 2, preferably between the plasma 5 and the sputter protection plate 44. It forms a thermal barrier against the plasma 5 for the entire target injection arrangement comprising the target nozzle 2 and the sputter protection plate 44 with the gas pressure chamber 41.

The radially arranged cooling channels 48 for the coolant can preferably have channel guides which run back and forth in a star-shaped manner with respect to the aperture of the heat protection plate 47 or can have zigzag structures. They can also be integrated directly in the sputter protection plate 44.

Figure 4:
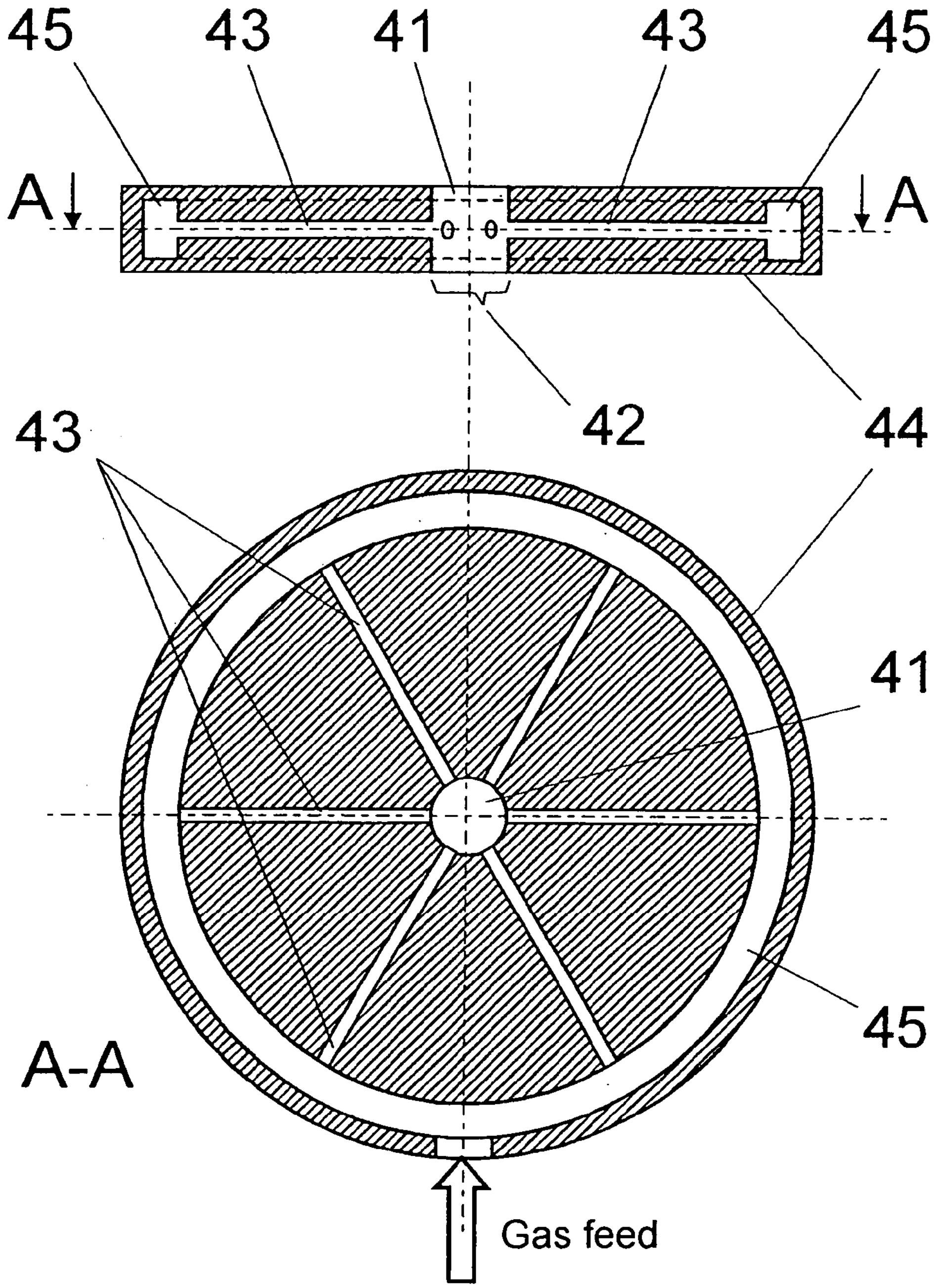
FIG. 4 shows an advantageous embodiment form of the sputter protection plate according to FIG. 3 with six symmetrically arranged radial channels for the supply of buffer gas.

FIG. 4 shows a special construction of the sputter protection plate 44 from FIG. 3 in two sectional views from the side (top drawing) and from above (bottom drawing). In this example, the sputter protection plate 44 is circular and has six radial channels 43 which are arranged so as to be uniformly distributed around the gas pressure chamber 41 and which uniformly feed the buffer gas 6 from a concentric annular distribution channel 45 into the gas pressure chamber 41. The annular distribution channel 45 has a gas inlet opening for connecting a gas supply unit (not shown) to adjust the desired gas pressure quasi-statically.

Figure 5:
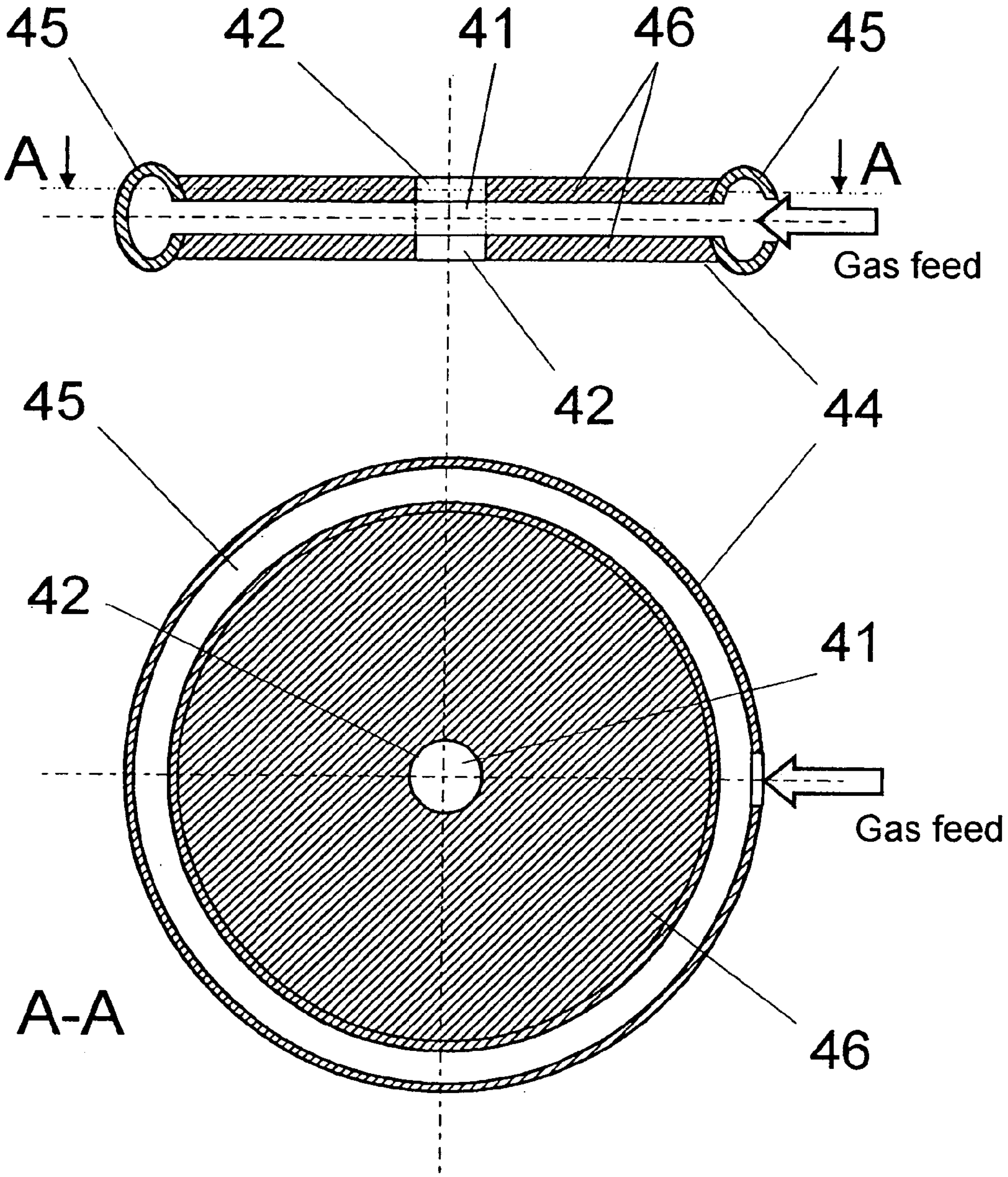
FIG. 5 shows an advantageous construction of the sputter protection plate which is divided into two parallel terminating plates, the terminating plates being connected to one another at a defined distance by a gas distribution channel arranged at the periphery.

FIG. 5 shows two sectional views of a two-part sputter protection plate 44 having two parallel terminating plates 46 at a defined distance from one another. The edges of the terminating plates 46 are connected to a peripheral annular distribution channel 45 in a gas-tight manner. Each of the congruent terminating plates 46 has an aperture 42 that is arranged as a bore hole coaxial to the center axis of the entire sputter protection plate 44 (which is cylindrically shaped in this example). A gas feed which adjusts a quasi-static pressure of some 10 mbar in the gas pressure chamber 41 as in the preceding examples is connected to at least one location of the annular distribution channel 45 in order to achieve a statistical average of at least one thousand collisions with molecules of the buffer gas 6 for a sputter particle 51 that enters the gas pressure chamber 41. When a lower gas pressure of the buffer gas 6 is wanted or required, the distance between the terminating plates 46 can be increased in this construction of the sputter protection plate 44 simply by means of enlarging the annular distribution channel 45.

Figure 6:
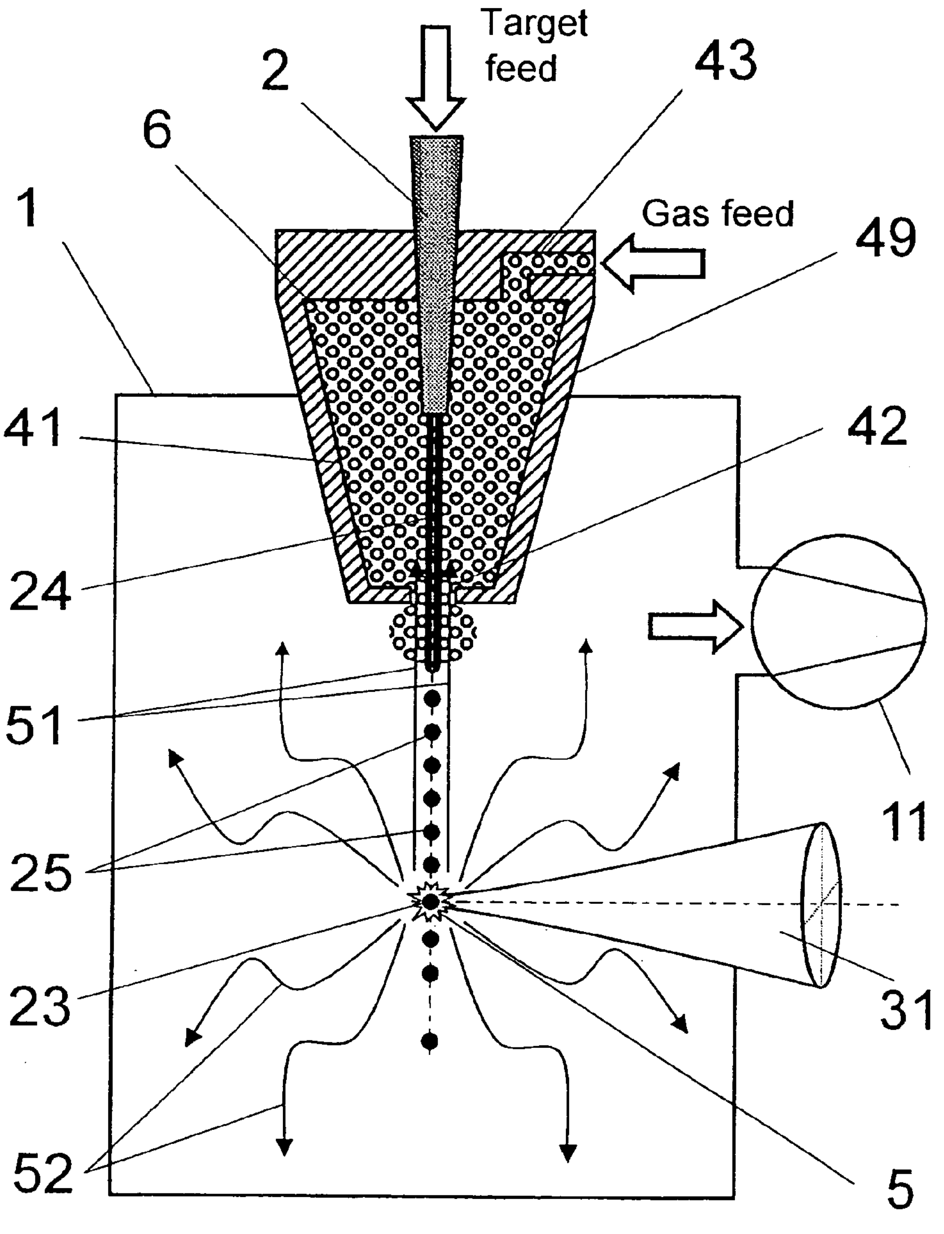
FIG. 6 shows a construction of the arrangement according to the invention with a nozzle antechamber to which a buffer gas is admitted at a defined pressure.

FIG. 6 shows a special realization of the target injection system with an increased operating life of the target nozzle 21. The target material in the form of a tin salt solution (e.g., tin(II) chloride or tin(IV) chloride) is pressed through the target nozzle 2 in the form of a continuous jet 24 into a gas pressure chamber 41 directly adjoining the target nozzle 2. In this case, the gas pressure chamber 41 is constructed as a completely closed antechamber housing 49 around the target nozzle 2 in which a channel 43 supplies the buffer gas 6 under pressure. The target material exits the antechamber housing 49 through the aperture 42, preferably still as a continuous jet 24.

As was already described in the preceding examples, an inert gas (e.g., nitrogen, argon or another noble gas) is used in the gas pressure chamber 41 as buffer gas 6. The buffer gas 6 is supplied in such a way that a quasi-static pressure is adjusted in the gas pressure chamber 41 such that approximately one thousand collisions of a sputter particle 51 with the gas molecules of the introduced buffer gas 6 in the gas pressure chamber 41 are ensured. This corresponds to a chamber pressure of several tens of mbar depending upon the buffer gas 6 that is used and upon the path length through the gas pressure chamber 41 (along the target path 22).

A portion of the buffer gas 6 exits the gas pressure chamber 41 through the aperture 42 of the antechamber housing 49 along with the target jet 24 and is pumped out by the pump 11 along with the evacuated interaction chamber 1 so that no gas atmosphere impairing transparency occurs in the interaction chamber 1 during the interaction of the individual targets 25 of the target flow 21 with the laser beam 31 for the short-wavelength radiation emitted from the plasma 5, e.g., EUV radiation. However, it is also advantageous for protecting the nozzle when the buffer gas 6 has a low transparency for the photons 52 emitted from the plasma 5 because, in this way, the gas pressure chamber 41 acts at the same time as an optical barrier.

Energy particles from the plasma 5 (fast sputter particles 51 and high-energy radiation from photons 52) which reach and traverse the gas pressure chamber 41 are decelerated by colliding with the buffer gas 6 in such a way that the sputter rate at the target nozzle 2 is appreciably reduced compared to the "unarmed" target nozzle 2. The operating life of the target nozzle is substantially increased in this way, i.e., instabilities of the target jet 24 due to erosion craters 27 (as can be seen in FIG. 2 according to use in the prior art) do not occur even after very high numbers of pulses (>1 million plasma generation processes) by means of the laser beam 31 (as energy beam 3).

Figure 7:
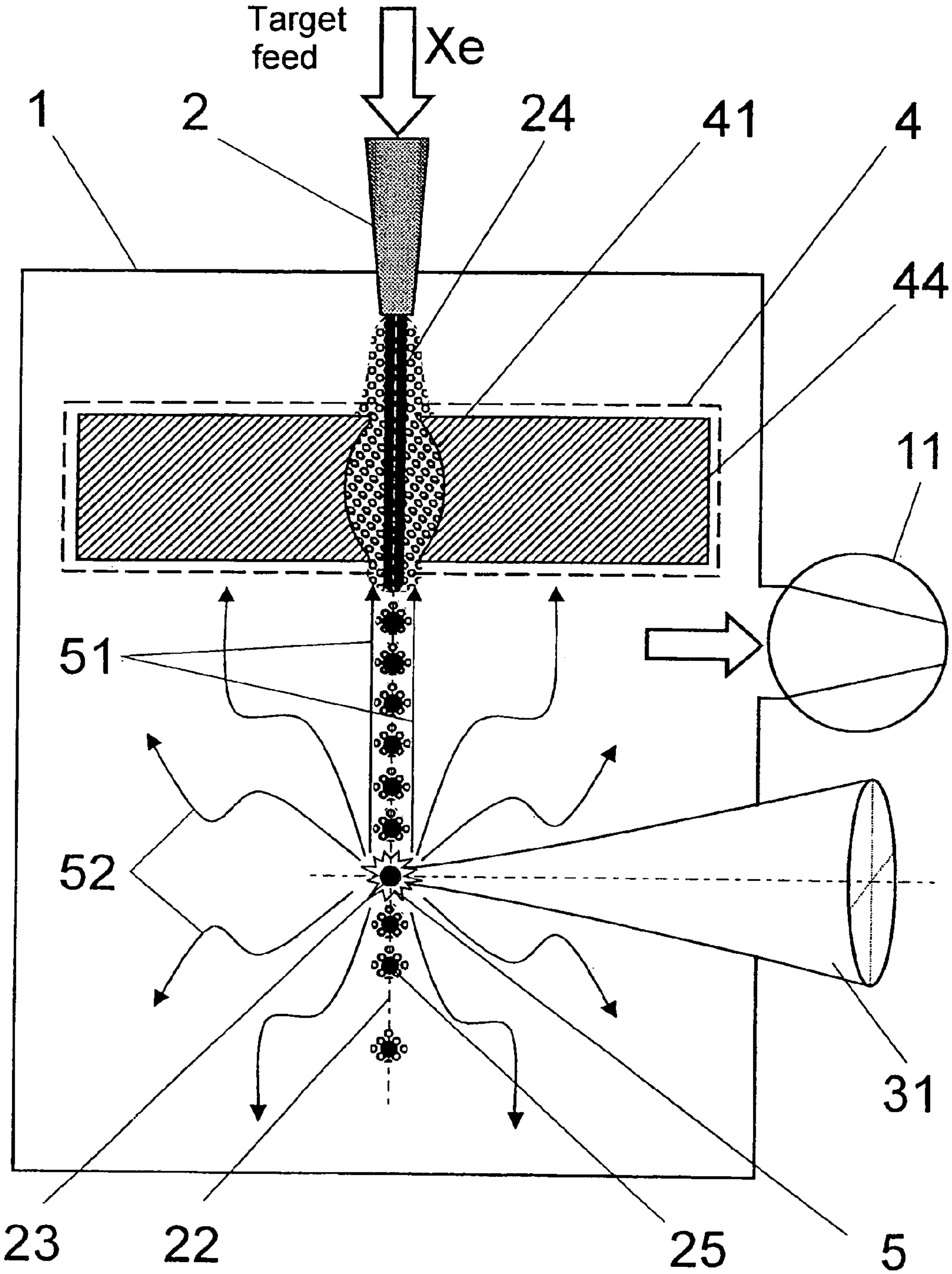
FIG. 7 shows a sputter protection plate, modified compared to FIG. 3, which has no gas feed and is used for target materials with a high gas pressure, e.g., xenon, and in which the necessary gas density in the gas pressure chamber is brought about by vaporizing target material.

FIG. 7 shows another special embodiment form of the invention. This "simplified" type of construction of the invention assumes the use of a target material with a high vapor pressure (>50 mbar), for example, xenon.

After the xenon has left the target nozzle 2 as a liquid continuous jet 24, a vaporization or sublimation of the target material immediately begins at its surface in the vacuum atmosphere of the interaction chamber 1. When the jet 24 that vaporizes in this way enters the adjoining gas pressure chamber 41, which has two slightly narrowed apertures 42, the vaporization process continues in the gas pressure chamber 41 and leads to a considerable pressure of gaseous xenon. On one hand, this xenon gas is highly absorbent for the short-wavelength radiation (photons 52) generated at the interaction point 23 of the plasma 5, particularly in the desired EUV range. On the other hand, because of the molecular mass and size of the xenon molecules, it is an excellent buffer gas 6 for decelerating sputter particles 51 (debris) from the plasma 5.

After passing through the gas pressure chamber 41 which is accordingly filled with buffer gas in a self-generating way, the target jet 24 exits the gas pressure chamber 41 through the aperture 42 and disintegrates after a short distance along the target path 22 into individual targets 25; selected individual targets 25 are then struck in the usual manner by the laser beam 31 at the interaction point 23 and are converted into radiating plasma 5.

In addition to the constructions described above, any other embodiment forms of the invention can easily be derived by the person skilled in the art without departing from the inventive teaching. The core of the invention is a gas pressure chamber 41 of any construction which decelerates or absorbs energy particles and radiation from the plasma 5 along the path of the target flow 21 through a partially increased gas pressure in the interaction chamber 1 for plasma generation and the sputter effect of the plasma 5 on the target nozzle is accordingly minimized. In every case, this results in a considerably prolonged operating life of the target nozzle and a generally improved stability of the target flow 1 shaped by the target nozzle 2.

While the foregoing description and drawings represent the present invention, it will be obvious to those skilled in the art that various changes may be made therein without departing from the true spirit and scope of the present invention.

REFERENCE NUMBERS

1 interaction chamber
11 pump(s)
2 target nozzle
21 target flow
22 target path
23 interaction point
24 continuous jet
25 individual target
26 outlet opening
27 sputter crater
3 energy beam
31 laser beam
4 nozzle protection device
41 gas pressure chamber
42 aperture
43 channel
44 sputter protection plate
45 annular distribution channel
46 terminating plate
47 heat protection plate
48 coolant channels
49 antechamber housing
5 plasma
51 sputter particles
52 photons
6 buffer gas
Xe xenon

What is claimed is:

1. An arrangement for providing a reproducible target flow for the energy beam-induced generation of a plasma emitting short-wavelength radiation, particularly for the generation of EUV radiation, comprising:

a target nozzle being provided for introducing target material under pressure into an interaction chamber in form of a liquid target beam/jet;

an energy beam being directed to the target beam/jet at an interaction point in the interaction chamber;

a nozzle protection device being provided in the interaction chamber between the target nozzle and the interaction point for the generation of plasma; and said nozzle protection device containing a gas pressure chamber which has an aperture along the target beam/jet path for unobstructed passage of the entire diameter of the liquid target beam/jet and which is filled with a buffer gas that is maintained under a pressure at which a sputter particle from the plasma undergoes at least one thousand collisions with particles of the buffer gas when traversing the gas pressure chamber.

2. The arrangement according to claim 1, wherein the nozzle protection device is constructed as a sputter protection plate in which the gas pressure chamber is incorporated, wherein the gas pressure chamber has a cylindrical aperture and at least one channel for supplying the buffer gas.

3. The arrangement according to claim 2, wherein the sputter protection plate has a plurality of uniformly distributed radial channels as gas feeds for the buffer gas and an annular distribution channel which is arranged concentrically around the gas pressure chamber and which connects the radial channels, wherein the annular distribution channel has at least one gas inlet opening that does not meet one of the radial channels.

4. The arrangement according to claim 2, wherein the sputter protection plate has an upper and a lower terminating plate, each with an aperture for the passage of the target flow, wherein the terminating plates are connected parallel to one another by an annular distribution channel which has at least one inlet opening for gas supply.

5. The arrangement according to claim 4, wherein the apertures of the gas pressure chamber are arranged in circular terminating plates as coaxial bore holes.

6. The arrangement according to claim 1, wherein the nozzle protection device has a heat protection plate with coolant channels.

7. The arrangement according to claim 6, wherein the coolant channels of the heat protection plate are integrated in the material of the gas pressure chamber.

8. The arrangement according to claim 1, wherein the gas pressure chamber of the nozzle protection device is arranged in the interaction chamber at a defined distance from the target nozzle.

9. The arrangement according to claim 1, wherein the gas pressure chamber of the nozzle protection device is arranged in the interaction chamber directly around the target nozzle.

10. The arrangement according to claim 9, wherein the gas pressure chamber is arranged around the opening of the target nozzle by an antechamber housing that surrounds the target nozzle in a gas-tight manner, wherein the antechamber housing has an aperture that is centered with respect to the axis of the target flow and has at least one channel for feeding the buffer gas.

11. The arrangement according to claim 1, wherein the target flow contains tin as the chief target material, wherein the target material can liquefy under necessary defined process conditions.

12. The arrangement according to claim 11, wherein the target flow contains tin chlorides.

13. The arrangement according to claim 12, wherein the target flow contains tin(IV) chloride.

14. The arrangement according to claim 12, wherein the target flow contains tin(II) chloride in alcoholic solution.

15. The arrangement according to claim 12, wherein the target flow contains tin(II) chloride in aqueous solution.

16. The arrangement according to claim 1, wherein the buffer gas for generating a partial pressure in the gas pressure chamber is an inert gas.

17. The arrangement according to claim 16, wherein the buffer gas is nitrogen.

18. The arrangement according to claim 16, wherein the buffer gas is a noble gas.

19. The arrangement according to claim 18, wherein the buffer gas is argon.

20. The arrangement according to claim 16, wherein the buffer gas is a mixture of inert gases.

21. The arrangement according to claim 20, wherein the buffer gas is a mixture of noble gases, preferably helium and neon.

22. The arrangement according to claim 8, wherein the target material has a vapor pressure of >50 mbar; and wherein the gas pressure chamber is filled with buffer gas of gaseous target material due to surface vaporization of the liquid target beam/jet in the interaction chamber, whereby a partial pressure of some 10 mbar is adjusted due to the vaporized target material surrounding the target beam/jet flowing through the gas pressure chamber.

23. The arrangement according to claim 22, wherein the target flow comprises liquid xenon.

24. The arrangement according to claim 22, wherein the gas pressure chamber has at least one narrowed aperture for generating a dynamic pressure.

25. The arrangement according to claim 24, wherein the gas pressure chamber is barrel-shaped.

* * * * *